(12) United States Patent
Vich

(10) Patent No.: US 12,092,490 B2
(45) Date of Patent: Sep. 17, 2024

(54) VERY HIGH RESOLUTION SPEED AND POSITION SENSOR

(71) Applicant: Continental Automotive Systems, Inc., Auburn Hills, MI (US)

(72) Inventor: Gaetan Vich, Clarkston, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days.

(21) Appl. No.: 17/453,660

(22) Filed: Nov. 5, 2021

(65) Prior Publication Data
US 2023/0147158 A1 May 11, 2023

(51) Int. Cl.
*G01D 5/14* (2006.01)
*G01B 7/30* (2006.01)

(52) U.S. Cl.
CPC .............. *G01D 5/145* (2013.01); *G01B 7/30* (2013.01)

(58) Field of Classification Search
CPC .................................. G01D 5/145; G01B 7/30
See application file for complete search history.

(56) References Cited

U.S. PATENT DOCUMENTS

| | | | |
|---|---|---|---|
| 5,241,267 A | 8/1993 | Gleixner | |
| 6,819,101 B2* | 11/2004 | Yokotani | G01D 5/145 |
| | | | 324/207.25 |
| 6,977,497 B1* | 12/2005 | Yokotani | G01D 5/147 |
| | | | 324/207.21 |
| 7,477,052 B2* | 1/2009 | Schmidt | G01D 5/145 |
| | | | 324/207.2 |
| 9,823,092 B2* | 11/2017 | David | G01D 5/147 |
| 2004/0021457 A1 | 2/2004 | Johnson | |

FOREIGN PATENT DOCUMENTS

WO 2017078665 A1 5/2017

OTHER PUBLICATIONS

The International Search Report and the Written Opinion of the International Searching Authority mailed on Jan. 1, 30, 2023, for the counterpart PCT Application No. PCT/US2022/079357.

* cited by examiner

*Primary Examiner* — Reena Aurora

(57) ABSTRACT

A very high resolution sensor for detecting an angular rotation of a rotating target, the sensor including a first pair of Hall effect sensors and a second pair of Hall effect sensors. A first magnetic flux density differential of the rotating target is generated from the first pair of Hall effect sensors and a second magnetic flux density differential of the rotating target is generated from the second pair of Hall effect sensors. A pulse corresponding to an amount of angular rotation of the rotating target is output based on the second magnetic flux density differential reaching the first magnetic flux density differential.

18 Claims, 3 Drawing Sheets

VERY HIGH RESOLUTION SPEED AND POSITION SENSOR

BACKGROUND

1. Field

The present application relates to sensors and sensorics, and more particularly to a very high resolution sensor for detecting angular rotation of a toothed wheel or a magnetic pole wheel and a method of detecting angular rotation of an toothed wheel.

2. Description of Related Art

Conventionally, wheel speed sensors may be mounted on the knuckles of a vehicle. The wheel speed sensors may detect a rotation of a wheel with which the wheel speed sensor is associated and output a pulse when a specified angular rotation is detected.

A pulse output by the wheel speed sensor may be utilized for vehicle control, such as to calculate a wheel speed according to the frequency of the pulses or a distance traveled according to the quantity of output pulses. Therefore, utilizing the angular rotation of the wheel about a radial axis of the wheel and a diameter of the wheel, the displacement or distance of the wheel traveled across a surface, such as a road, may be determined. Alternatively, the frequency of the pulses, such as a number of pulses per second, may be used to calculate an overall speed of the vehicle. Accordingly, various vehicular applications may leverage this information to provide appropriate vehicle control.

In one example, a speed of a wheel detected by a wheel speed sensor may be utilized to implement an anti-lock braking system (ABS). In particular, the wheel speed detected by a wheel speed sensor at one wheel may differ from the wheel speed detected by another wheel speed sensor at another wheel. Accordingly, the wheel speeds of the wheels detected by the various wheel speed sensors may be analyzed to determine whether slippage of one or more wheels is occurring during a braking operation, and if so anti-lock braking may be performed to account for such slippage, prevent wheels from locking, and to more safely brake the vehicle.

In an additional example, autonomous or semi-autonomous vehicles may perform parking of a vehicle, such as an autonomous or driver assisted parallel parking operation. To safely position the vehicle when parallel parking is performed, an accurate and precise position of the vehicle is required to avoid objects, such as curbs and other vehicles. Thus, fine control of the wheels of the vehicle is necessary, to more accurately and precisely control the position of the vehicle and to more safely and quickly park the vehicle.

Accordingly, a very high resolution wheel position and speed sensor would increase the precision and accuracy of vehicle systems for better controlling vehicle position.

SUMMARY

Aspects of embodiments of the present application relate to a very high resolution sensor for detecting angular rotation of an object about an axis and a method of detecting angular rotation of an object about an axis.

According to an aspect of an embodiment, there is provided a very high resolution sensor including a first pair of sensors configured to detect a first magnetic flux density differential of a rotating target; a second pair of sensors configured to detect a second magnetic flux density differential of the rotating target; and a controller configured to determine that a second value of the second magnetic flux density differential of the rotating target reaches a first value of the first magnetic flux density differential of the rotating target and output a pulse corresponding to a degree of rotation of the rotating target.

According to an aspect of an embodiment, there is provided a method of detecting an angular rotation of a rotating target, the method including detecting, by a first pair of sensors, a first magnetic flux density of a rotating target; detecting, by a second pair of sensors, a second magnetic flux density of the rotating target; determining that a second value of the second magnetic flux density differential of the rotating target reaches a first value of the first magnetic flux density differential of the rotating target; and outputting a pulse corresponding to a degree of rotation of the rotating target.

BRIEF DESCRIPTION OF THE DRAWINGS

The above and other aspects will be more clearly understood from the following brief description taken in conjunction with the accompanying drawings, in which.

DETAILED DESCRIPTION

Figure 1:
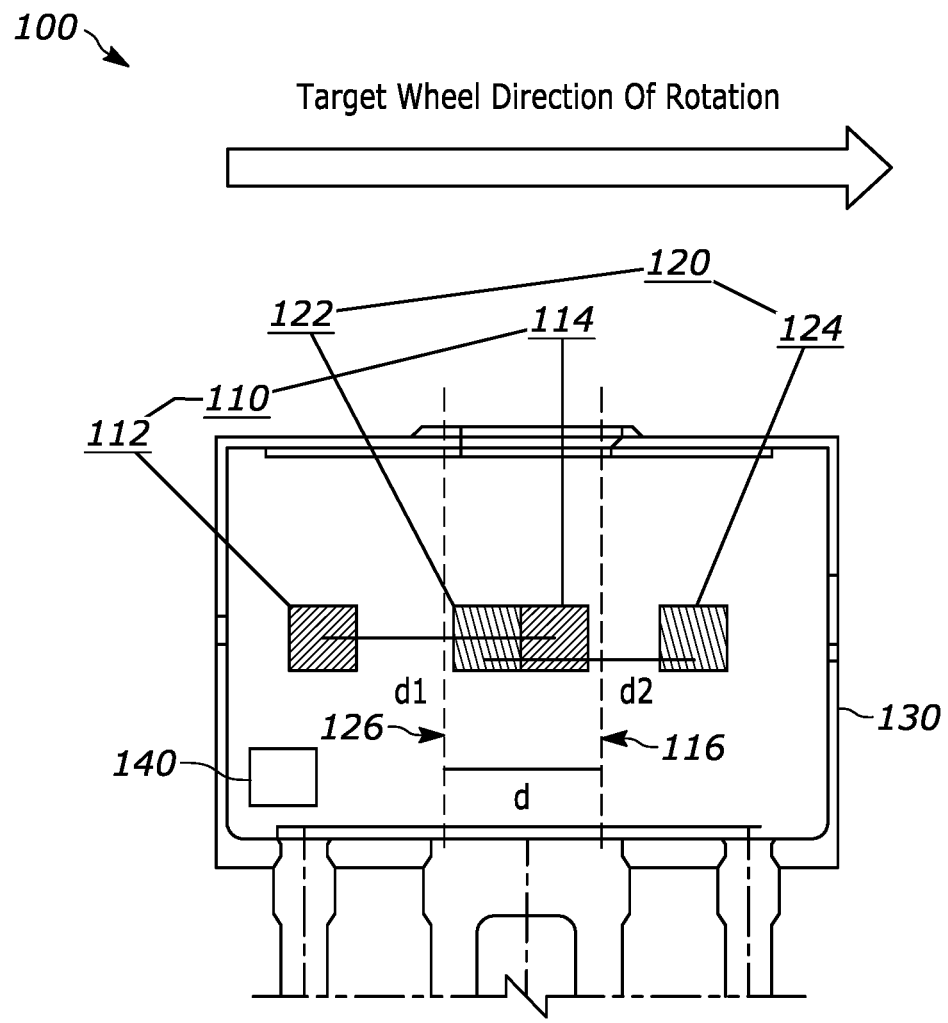
FIG. 1 is a diagram illustrating a very high resolution sensor, according to an embodiment.

FIG. 1 illustrates a very high resolution sensor, according to an embodiment.

A very high resolution sensor 100 according to an embodiment includes a first pair of magnetic sensors 110, a second pair of magnetic sensors 120, a substrate 130, and a controller 140.

The first pair of magnetic sensors 110 and the second pair of magnetic sensors 120 may be Hall effect sensors mounted on a substrate 130. The first pair of magnetic sensors 110 and the second pair of magnetic sensors 120 may be identical sensors or sensors having a same sensitivity.

The substrate 130 may be, for example, a substrate of a wheel speed sensor (WSS) for detecting rotation of a shaft to which a wheel of a vehicle is mounted, a substrate of an engine speed sensor (ESS) for to which a crankshaft of an engine is mounted, or any other substrate of a rotation sensor for detecting rotation of an object about an axis of rotation.

The first pair of sensors 110 may include a first sensor 112 and a second sensor 114. The first sensor 112 and the second sensor 114 may be mounted to the substrate 130 at a first distance d1 from each other. Accordingly, a center line 116 between the first sensor 112 and the second sensor 114 may be half (d1/2) the first distance d1 between the first sensor 112 and the second sensor 114.

The second pair of sensors 120 may include a third sensor 122 and a fourth sensor 124. The third sensor 122 and the fourth sensor 124 may be mounted to the substrate 130 at a second distance d2 from each other. Accordingly, a center line 126 between the third sensor 122 and the fourth sensor 124 may be half (d2/2) the second distance d2 between the third sensor 122 and the fourth sensor 124.

The first distance d1 between the first sensor 112 and the second sensor may be equivalent to the second distance d2 between the third sensor 122 and the fourth sensor 124.

The first pair of sensors 110 and the second pair of sensors 120 may be aligned in the form of a row on the substrate 130. The alignment of the sensors formed in a row may be parallel to a direction of the angular rotation of a rotating target.

The substrate may be positioned with respect to a target such that the first pair of sensors 110 and the second pair of sensors detect an angular rotation of the target wheel. For example, the target may be a shaft or axle to which a wheel is mounted. The shaft or axle may possess a completely regular pattern, thereby enabling the electronic control unit to calculate the speed of rotation based on the quantity of pulses per period or the distance traveled of the wheel to which the wheel is mounted based on the quantity of pulses, the effective distance d along the target perimeter, and the diameter of the vehicle wheel.

According to the positioning of the first pair of sensors 110 and the second pair of sensors 120 relative to the rotating target, a magnetic flux density differential may be measured. In particular, because of the alignment of the first pair of sensors 110 and the second pair of sensors 120 relative to the rotating target, and because of the common distance d1 between the first pair of sensors 110 and the common distance d2 between the second pair of sensors 120, the magnitude or value of the magnetic flux density differential output by the first pair of sensors 110 and the second pair of sensors 120 will be equivalent, but detected as shifted in time during target wheel rotation.

More specifically, the first sensor 112 and the second sensor 114 of the first pair of sensors 110 may execute a first magnetic flux density differential measurement of the target, as the target rotates about the axis of rotation. The first magnetic flux density differential measurement of the target may be output from the first sensor 112 and the second sensor 114 to the controller 140.

The alignment of the first pair of sensors 110 on the substrate 130 relative to the rotating target may produce the first magnetic flux density differential of the target measured at a first time.

On the other hand, the third sensor 122 and the fourth sensor 124 of the second pair of sensors 120 may detect a second magnetic flux density differential of the target, as the target rotates about the axis of rotation. The second magnetic flux density differential of the target may be output from the third sensor 122 and the fourth sensor 124 to the controller 140.

The alignment of the second pair of sensors 120 on the substrate 130 relative to the rotating target, and such alignment being relative to the first pair of sensors 110, may produce the second magnetic flux density differential of the target measured at a second time, which is later in time than the first time.

The controller 140 may be a central processing unit (CPU), electronic control unit (ECU), microprocessor, application-specific integrated circuit (ASIC), or other programmable circuitry. The controller 140 may include memory, such as random access memory (RAM), cache memory, or other memory programmed to store computer-readable instructions executable by the controller 140 for controlling operations of the very high resolution sensor 100.

The computer-readable instructions executed under the control of the controller 140 may cause the controller 140 to perform a method of detecting rotation of a rotating target.

The controller 140 may be mounted to the substrate 130.

The controller 140 may be communicatively coupled to the first pair of sensors 110 and the second pair of sensors 120 through, for example, a wired bus or wireless communication interface that performs communication by one or more wireless protocols, such as WiFi, Bluetooth, or other applicable wireless communication protocol or standard.

The controller 140 may receive the first magnetic flux density differential measurement from the first pair of sensors 110 and the second magnetic flux density differential measurement from the second pair of sensors 120. The controller 140 may determine a target wheel position at which the value of the magnetic flux density differential measurement by the first pair of sensors 110 (leading sensors) is equal to the value of the second magnetic flux density differential measurement from the second pair of sensors (lagging sensors). At the position where the output of the lagging pair of sensors 120 is equal to the output of the leading pair of sensors 110, the controller 140 may output a pulse.

The generation of two pulses may indicate a displacement by a distance d of the target detected by the very high resolution sensor 100. For example, the distance d may indicate a one degree rotation of the rotating target, based on its diameter.

The resolution of the very high resolution sensor 100 may be controlled by the distance d between the leading pair of sensors 110 and the lagging pair of sensors 120. For example, increasing a distance d between the first center line 116 and the second center line 126 may decrease the resolution of the very high resolution sensor 100. Conversely, decreasing the distance d between the first center line 116 and the second center line 126 may increase the resolution of the very high resolution sensor 100.

The value of the magnetic flux density measured by the two pairs of sensors 110, 120 when the sensors 110, 120 are located over the exact same position on the target wheel is expected to be the same. To ensure this is the case, filtering, calibration, trimming and other techniques may be used during the manufacturing process of the IC and in corresponding algorithm.

As described above, any of various systems receiving the pulse train output by the very high resolution sensor 100 may then utilize the pulse train, which represents the rotation of the target, to determine a speed of rotation of the target, a distance of rotation of the target such as a shaft, a distance of rotation of an object connected to the target such as a wheel attached to a shaft, or any other calculation dependent upon the rotation of the target to be determined.

Figure 2:
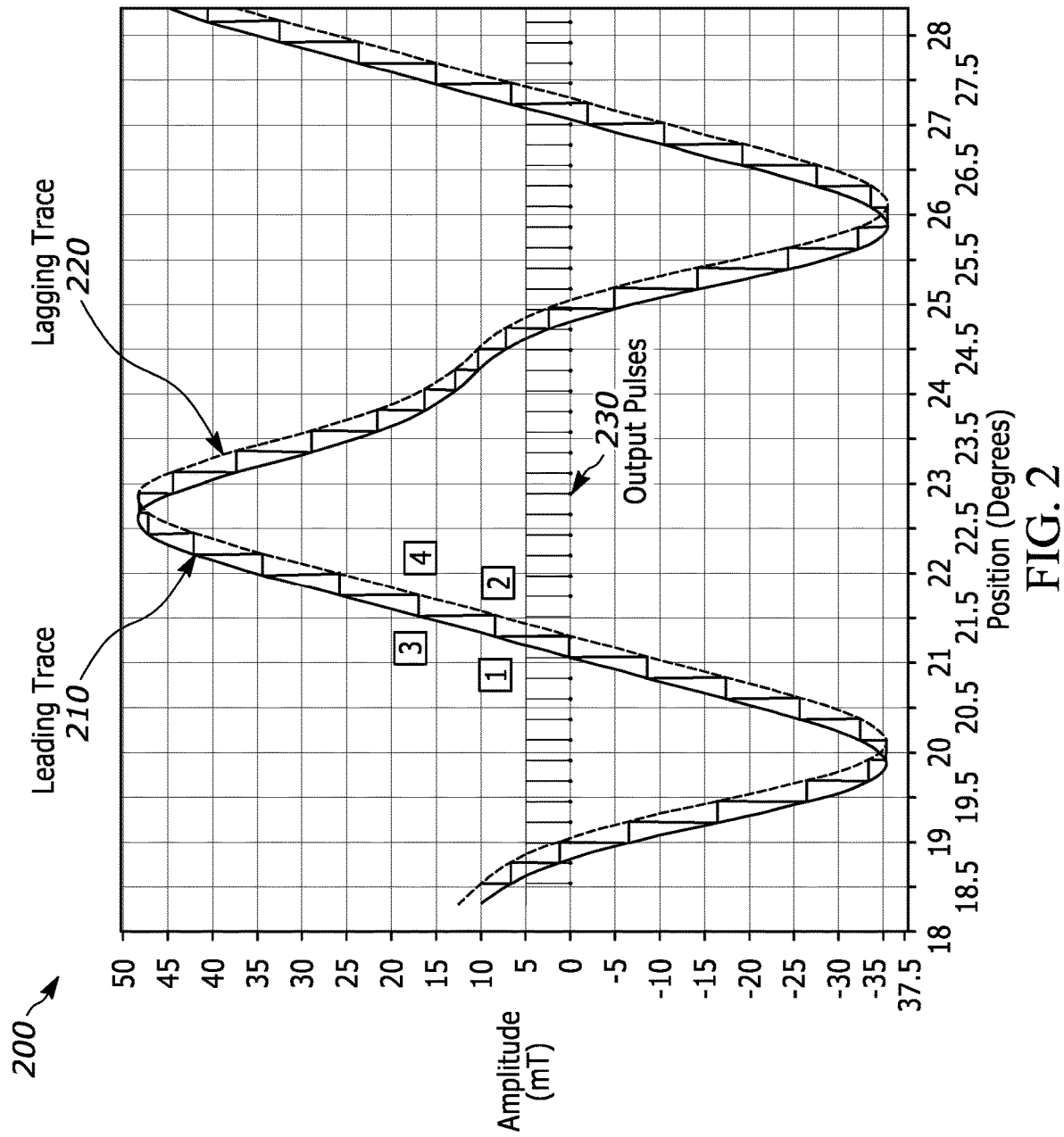
FIG. 2 is a graph illustrating magnetic flux density differential of a rotating target detected by a very high resolution sensor, according to an embodiment.

FIG. 2 is a graph illustrating magnetic flux density differential of a rotating target detected by a very high resolution sensor, according to an embodiment.

As illustrated in FIG. 2, a vertical axis of the graph 200 includes a first amplitude 210 of the first magnetic flux density differential of the target output by the first pair of sensors 110 and a second amplitude 220 of the second magnetic flux density differential of the target output by the second pair of sensors 120. In FIG. 2, the target may be an edge of a gear coupled to a rotating shaft.

As described above with respect to FIG. 1, the alignment of the first pair of sensors 110 on the substrate 130 relative to the rotating target may produce the first magnetic flux density differential of the target detected at a first time. Consequently, the first amplitude 210 of the first magnetic flux density differential of the target output by the first pair of sensors 110 may be continuously output over time in accordance with the rotation of the rotating target. As illustrated in FIG. 2, the values of the first amplitude 210 of the first magnetic flux density differential of the target output by the first pair of sensors 110 may collectively form a leading trace.

As described above with respect to FIG. 1, the alignment of the second pair of sensors 120 on the substrate 130 relative to the rotating target may produce the second magnetic flux density differential of the target measured at a second time. Consequently, a second amplitude 220 of the second magnetic flux density differential of the target output by the second pair of sensors 120 may also be continuously output over time in accordance with the rotation of the rotating target. As illustrated in FIG. 2, the values of the second amplitude 220 of the second magnetic flux density differential of the target output by the second pair of sensors 120 may collectively form a lagging trace.

Owing to the alignment of the second pair of sensors 120 on the substrate 130 relative to the rotating target, and relative to the first pair of sensors 110, the second magnetic flux density differential of the target is output later in time than the first magnetic flux density differential of the target. Additionally, because of the alignment of the first pair of sensors 110 and the second pair of sensors 120 relative to the rotating target, and because of the common distance d1 between the first pair of sensors 110 and the common distance d2 between the second pair of sensors 120, the magnitude or value of the magnetic flux density differential output by the first pair of sensors 110 and the second pair of sensors 120 will be identical. Accordingly, the first amplitude 210 of the first magnetic flux density differential of the target output by the first pair of sensors 110 ("leading trace") over time may be identical, but shifted in time, from the second amplitude 220 of the second magnetic flux density differential of the target output by the second pair of sensors 120 ("lagging trace") over time.

The controller 140 records the values of the first magnetic flux density differential of the target output by the first pair of sensors 110 ("leading trace") over time and the second amplitude 220 of the second magnetic flux density differential of the target output by the second pair of sensors 120 ("lagging trace") over time. The controller 140 may record the values of the first magnetic flux density differential of the target output by the first pair of sensors 110 ("leading trace") over time and the second amplitude 220 of the second magnetic flux density differential of the target output by the second pair of sensors 120 ("lagging trace") over time in registers, as a database, lookup table, or other data structure accessible to the controller 140. Alternatively, the controller 140 may record values of the first magnetic flux density differential of the target output by the first pair of sensors 110 ("leading trace") every unit of time, such as one microsecond, and output pulses when detecting equivalent values of the second magnetic flux density differential of the target output by the second pair of sensors 120 ("lagging trace") over time. Accordingly, the values of the first magnetic flux density differential of the target output by the first pair of sensors 110 ("leading trace") may be recorded over time, while the second amplitude 220 of the second magnetic flux density differential of the target output by the second pair of sensors 120 ("lagging trace") may be simply detected over time for comparison to the recorded values of the first magnetic flux density differential.

As illustrated in FIG. 2, when the magnitude or value of the second magnetic flux density differential output by the second pair of sensors 120 becomes equivalent to the magnitude or value of the first magnetic flux density differential output by the first pair of sensors 110—namely an edge of the rotating target object has moved a distance equal to the distance d between the first center line 116 between the first sensor 112 and the second sensor 114 of the first pair of sensors 110 and the second center line 126 between the third sensor 122 and the fourth sensor 124 of the second pair of sensors 120—then a pulse 230 is output by the controller 140.

For example, at a point 1 illustrated in FIG. 2, the magnitude or value of the first magnetic flux density differential output by the first pair of sensors 110 may have a first value. Then, at a point 2 illustrated in FIG. 2, the magnitude or value of the second magnetic flux density differential output by the second pair of sensors 120 may become equivalent to the first value. Accordingly, at point 2 illustrated in FIG. 2, a pulse 230 may be output.

Similarly, at a point 3 illustrated in FIG. 2, the magnitude or value of the first magnetic flux density differential output by the first pair of sensors 110 may have a second value. Then, at a point 4 illustrated in FIG. 2, the magnitude or value of the second magnetic flux density differential output by the second pair of sensors 120 may become equivalent to the second value. Accordingly, at point 4 illustrated in FIG. 2, another pulse 230 may be output.

As illustrated by way of example in FIG. 2, the very high resolution sensor 100 may output more than 5 pulses per degree of rotation, depending on the target wheel diameter and general geometry.

The resolution of the very high resolution sensor 100 illustrated in FIG. 2 is merely exemplary. As described above with respect to FIG. 1, a resolution of the very high resolution sensor 100 may be configured according to the distance d between the first center line 116 between the first sensor 112 and the second sensor 114 of the first pair of sensors 110 and the second center line 126 between the third sensor 122 and the fourth sensor 124 of the second pair of sensors 120.

Figure 3:
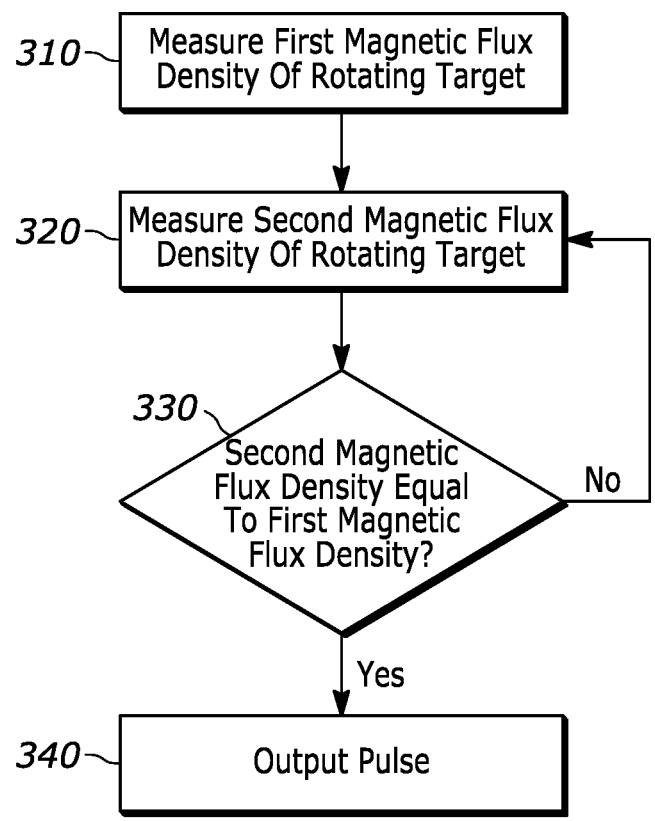
FIG. 3 is a flowchart of a method of detecting angular rotation of an object, according to an embodiment.

FIG. 3 is a flowchart of a method of detecting angular rotation of an object, according to an embodiment.

The method of FIG. 3 may be implemented by the very high resolution sensor 100 described above with respect to FIGS. 1 and 2.

As illustrated in FIG. 3, in step 310, the method 300 of detecting the angular rotation of an object includes measuring a first magnetic flux density differential of a rotating target using a first pair of sensors. In step 310, a value of a magnitude of the first magnetic flux density differential of the rotating target may be stored.

In step 320, a value of a second magnetic flux density differential of the rotating target is measured using a second pair of sensors.

In step 330, the value of the magnitude of the first magnetic flux density is compared to the value of the second magnetic flux density. If the value of the magnitude of the second magnetic flux density reaches the value of the magnitude of the first magnetic flux density (330—Y), then a pulse is output by the very high resolution sensor in step S340.

If the value of the magnitude of the second magnetic flux density has not reached the value of the magnitude of the first magnetic flux density (330—N), then a pulse is not output and measurement of the second magnetic flux density differential of the rotating target is continued to be performed until the value of the magnitude of the second magnetic flux density reaches the value of the magnitude of the first magnetic flux density.

As described above, a very high resolution sensor provides improved detection of rotation of a rotating target. The resolution of the very high resolution sensor may not be directly dependent on the number of teeth on the rotating target. Accordingly, a highly accurate and precise measurement of object rotation may be provided.

The invention claimed is:

1. A sensor system comprising:
a first pair of sensors configured to detect a first magnetic flux density differential of a rotating target at a first point in time;
a second pair of sensors configured to detect a second magnetic flux density differential of the rotating target at a second point in time after the first point in time; and
a controller configured to determine that a second value of the second magnetic flux density differential of the rotating target is equivalent to a first value of the first magnetic flux density differential of the rotating target and output a pulse corresponding to a degree of rotation of the rotating target in response to determining the second value of the second magnetic flux density differential of the rotating target is equivalent to the first value of the first magnetic flux density differential of the rotating target.

2. The sensor system of claim 1, wherein the first pair of sensors comprises:
a first Hall effect sensor; and
a second Hall effect sensor, and
wherein the second pair of sensors comprises:
a third Hall effect sensor; and
a fourth Hall effect sensor.

3. The sensor system of claim 2, further comprising:
a substrate,
wherein the first Hall effect sensor, the second Hall effect sensor, the third Hall effect sensor, the fourth Hall effect sensor, and the controller are mounted to the substrate.

4. The sensor system of claim 3, wherein the first Hall effect sensor, the second Hall effect sensor, the third Hall effect sensor, and the fourth Hall effect sensor are aligned on the substrate.

5. The sensor system of claim 4, wherein a first distance between the first Hall effect sensor and the second Hall effect sensor is equal to a second distance between the third Hall effect sensor and the fourth Hall effect sensor.

6. The sensor system of claim 4, wherein the third Hall effect sensor is disposed on the substrate between the first Hall effect sensor and the second Hall effect sensor.

7. The sensor system of claim 4, wherein a resolution of the sensor system corresponds to a first distance between the first Hall effect sensor and the second Hall effect sensor and a second distance between the third Hall effect sensor and the fourth Hall effect sensor.

8. The sensor system of claim 4, wherein the first Hall effect sensor, the second Hall effect sensor, the third Hall effect sensor, and the fourth Hall effect sensor are aligned on the substrate in a direction parallel to a direction of rotation of the rotating target about an axis of rotation of the rotating target.

9. The sensor system of claim 4, wherein the rotating target is a wheel.

10. A method of a sensor system detecting an angular rotation of a rotating target, the method comprising:
detecting, by a first pair of sensors, a first magnetic flux density of a rotating target at a first point in time;
detecting, by a second pair of sensors, a second magnetic flux density of the rotating target at a second point in time after the first point in time;
determining that a second value of the second magnetic flux density differential of the rotating target is equivalent to a first value of the first magnetic flux density differential of the rotating target; and
outputting a pulse corresponding to a degree of rotation of the rotating target in response to determining the second value of the second magnetic flux density differential of the rotating target is equivalent to the first value of the first magnetic flux density differential of the rotating target.

11. The method of claim 10, wherein the first pair of sensors comprises:
a first Hall effect sensor; and
a second Hall effect sensor, and
wherein the second pair of sensors comprises:
a third Hall effect sensor; and
a fourth Hall effect sensor.

12. The method of claim 11, wherein the first Hall effect sensor, the second Hall effect sensor, the third Hall effect sensor, the fourth Hall effect sensor, and the controller are mounted to a substrate of the sensor system.

13. The method of claim 12, wherein the first Hall effect sensor, the second Hall effect sensor, the third Hall effect sensor, and the fourth Hall effect sensor are aligned on the substrate.

14. The method of claim 13, wherein a first distance between the first Hall effect sensor and the second Hall effect sensor is equal to a second distance between the third Hall effect sensor and the fourth Hall effect sensor.

15. The method of claim 13, wherein the third Hall effect sensor is disposed on the substrate between the first Hall effect sensor and the second Hall effect sensor.

16. The method of claim 13, wherein a resolution of the very sensor system corresponds to a first distance between the first Hall effect sensor and the second Hall effect sensor and a second distance between the third Hall effect sensor and the fourth Hall effect sensor.

17. The method of claim 13, wherein the first Hall effect sensor, the second Hall effect sensor, the third Hall effect sensor, and the fourth Hall effect sensor are aligned on the substrate in a direction perpendicular to a direction of rotation of the rotating target about an axis of rotation of the rotating target.

18. The method of claim 13, wherein the rotating target is a wheel.

* * * * *